US005548982A

United States Patent [19]

Rawling

[11] Patent Number: 5,548,982

[45] Date of Patent: Aug. 27, 1996

[54] SECURITY BOLT FOR T-HANDLE ASSEMBLY WITH RETROFIT CAPABILITY

[76] Inventor: James Rawling, 5187 Mount Vernon Way, Atlanta, Ga. 30338

[21] Appl. No.: 276,647

[22] Filed: Jul. 19, 1994

[51] Int. Cl.[6] .............................. E05B 13/10; F16B 41/00

[52] U.S. Cl. .............................. 70/208; 70/229; 70/232; 70/386; 292/251; 411/910

[58] Field of Search .................... 70/208, 224, DIG. 57, 70/386, 229–232, 140; 411/910, 402, 396; 292/251, 252

[56] References Cited

U.S. PATENT DOCUMENTS

| | | | |
|---|---|---|---|
| 1,609,645 | 12/1926 | Dewire | 411/396 |
| 2,635,751 | 4/1953 | Schroeder et al. | 292/251 |
| 2,697,342 | 12/1954 | McConnell et al. | 70/224 |
| 3,089,330 | 5/1963 | Kerr | 292/251 |
| 3,122,012 | 2/1964 | Christopher | 292/251 |
| 4,069,696 | 1/1978 | Steinbach | 70/386 X |
| 4,111,477 | 9/1978 | Rigali | 292/252 |
| 4,540,322 | 9/1985 | Coffia | 411/396 |
| 4,904,145 | 2/1990 | Koutsoupidis | 411/396 |
| 4,977,768 | 12/1990 | Embry | 70/491 |
| 5,015,019 | 5/1991 | Razdolsky | 70/208 X |

FOREIGN PATENT DOCUMENTS

| | | | |
|---|---|---|---|
| 1461481 | 11/1966 | France | 70/208 |
| 0664386 | 1/1952 | United Kingdom | 411/396 |

*Primary Examiner*—Lloyd A. Gall
*Attorney, Agent, or Firm*—Alfred Hoyte

[57] ABSTRACT

An improved locking bolt for a T-handle assembly is provided. The locking bolt has an associated security collar which encircles the bolt and prevents axial movement of the T-handle housing relative to the bolt when the threaded end of the bolt is threaded into the door frame of the closure. The security collar is held in place by a pin which extends through corresponding apertures in the collar and the bolt. A ball bearing is positioned in a recess formed in the bolt to prevent axial movement of the collar on the bolt in the event that the pin is defeated. The bolt and the security collar also act as a secondary locking mechanism by preventing rotation of the bolt when the lock is released, a special wrench being required to rotate the bolt after the lock is removed.

6 Claims, 3 Drawing Sheets

134
140

150

160

166
166
164

170

180
182

180
182

134
182

268
266
264

190

SECURITY BOLT FOR T-HANDLE ASSEMBLY WITH RETROFIT CAPABILITY

BACKGROUND OF THE INVENTION

The present invention relates to a locking T-handle assembly for use with a container closure such as a vending machine, and more particularly to an improved bolt and associated security collar for use with T-handle assemblies.

T-handle or pop-handle lock assemblies are commonly used to secure the door of a vending machine or similar closure. A prior art T-handle assembly is shown in FIG. 1.

The T-handle assembly 10 includes a generally T-shaped handle 12 which fits into a generally T-shaped housing 14 which is disposed in a recess in the vending machine door. A lock 13 holds the T-handle 12 in the locked position against the force of spring 16. A bolt 18 extends axially through openings 20 and 22 in the T-handle 12 and the housing 14 respectively and has a threaded end which threads into a nut (not shown) in the vending machine. The T-handle 12 includes notches 24 which engage pins 26 when the lock is disengaged. The assembly 10 also includes a C-clip 30 which encircles the bolt 18 and is mounted behind spring 16 adjacent the rear face 32 of the housing 14.

In operation, a key is inserted into the lock 13 and is turned until the lock bolt 15 is disengaged from the corresponding notch 17 in housing 14 causing spring 16 to urge T-handle 12 into the extended position as is shown in FIG. 1. Notches 24 engage pins 26 whereby the T-handle can be turned causing the bolt 18 to screw out of the nut enabling the vending machine door to be opened.

The problem with the prior art T-handle assemblies is that once the lock is defeated the vending machine is readily opened by vandals and the like. Furthermore, even if the lock is not defeated the vending machine door can be pryed open by exerting enough force to pull the head of the bolt 18 through the rear face of T-handle 12 and housing 14 and defeat the C-clip 30. Previous attempts at increasing the security of T-handle locks have generally failed to address the problem.

U.S. Pat. No. 4,552,001 issued to Roop shows a high security T-handle assembly. Roop discloses numerous security features not generally present in the prior art including means for limiting lateral movement of the forward portion of the T-handle within the T-handle housing to protect against prying. Roop also discloses an auxiliary locking mechanism which gives added protection in the event one attempts to remove the inner cylinder of the lock by force. Roop does not include any reinforcements to prevent axial movement of the housing 14 and T-handle relative to the bolt 18 when a prying force is applied.

U.S. Pat. No. 5,212,972 describes a tamper resistant lock where the locking bolt cannot be retracted without rotating the key plug but does not disclose the use of any reinforcements towards the rear face of the housing 14 to protect against forcible opening of the vending machine door.

Thus the prior art fails to provide a T-handle locking assembly with substantial reinforcements designed to prevent forcible opening of the vending machine door.

SUMMARY OF THE INVENTION

It is an object of this invention to provide a T-handle assembly with improved resistance to forcible opening of the associated closure door.

It is a further object of this invention to provide a locking bolt and associated security collar for a T-handle assembly which provides substantially improved protection against forcible opening of the closure door.

It is a still further object of this invention to provide a T-handle assembly having a locking bolt and associated security collar which cannot be rotated without a special wrench.

It is another object of this invention to provide a locking bolt and security collar for a T-handle assembly which can be retro-fit into existing T-handle assemblies.

These and other objects of the invention are accomplished by providing an improved locking bolt for a T-handle assembly. The locking bolt has an associated security collar which encircles the bolt and prevents axial movement of the T-handle housing relative to the bolt when the threaded end of the bolt is threaded into the door frame of the closure. The security collar is held in place by a pin which extends through corresponding apertures in the collar and the bolt. A ball bearing is positioned in a recess formed in the bolt to prevent axial movement of the collar on the bolt in the event that the pin is defeated. The bolt and security collar also act as a secondary locking mechanism by preventing rotation of the bolt when the lock is released, a special wrench being required to rotate the bolt after the lock cylinder is removed.

DETAILED DESCRIPTION OF THE INVENTION

The present invention can be manufactured as an improved T-handle assembly or can be retro-fit onto an existing T-handle assembly as will be described below.

Figure 1:
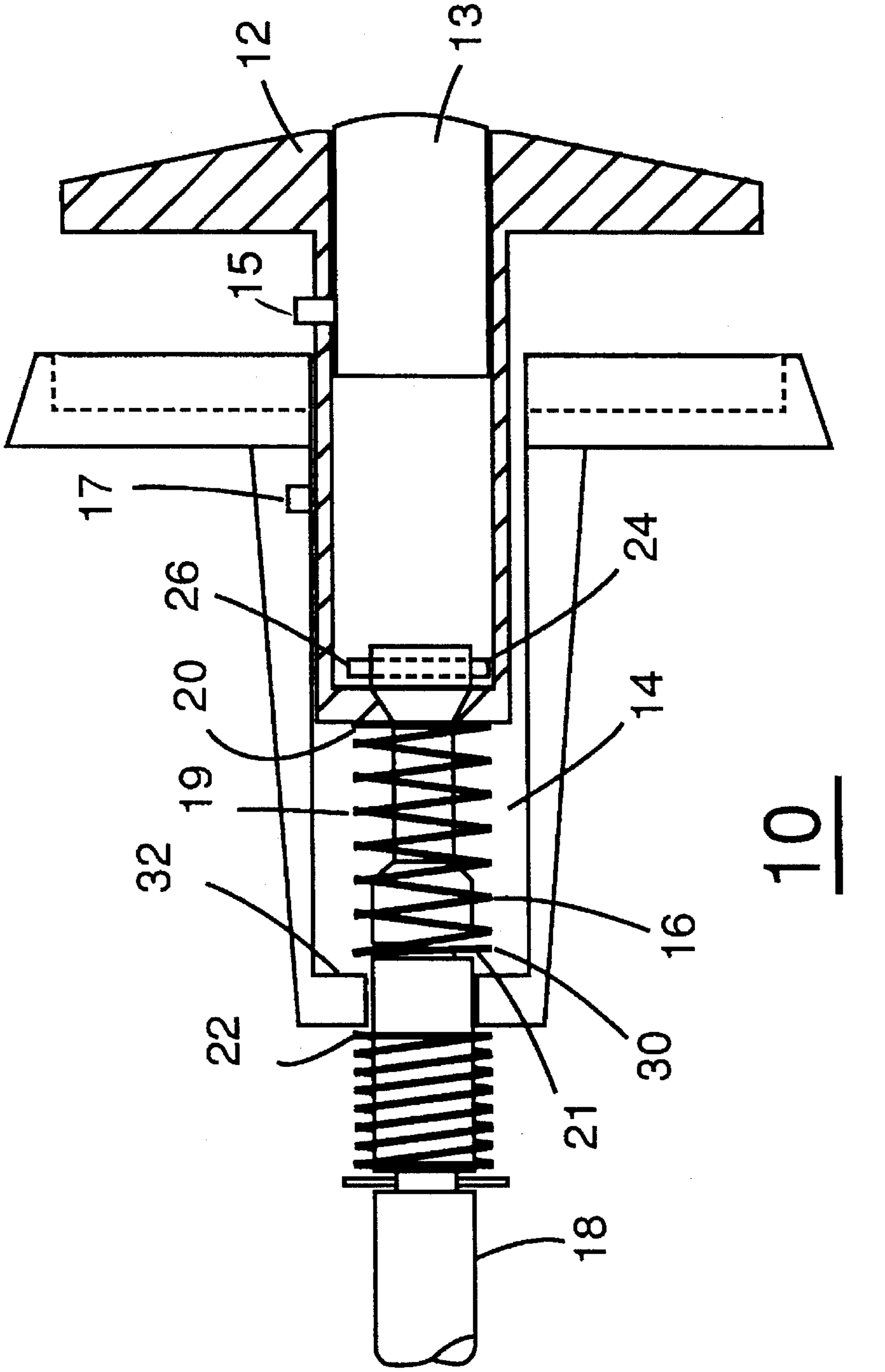
FIG. 1 shows a sectional view of a typical prior art T-handle assembly.

Referring again to FIG. 1 it can be seen that if the bolt 18 remains threaded into the door frame of the closure, the door can only be opened if the bolt 18 can be forced through T-handle 12, C-clip 30, and the rear face 32 of housing 14. If entry into the closure is attempted by forcing the door, e.g. by prying with a crowbar or similar tool, movement of the T-handle 12 and housing 14 relative to the bolt 18 can be initiated, and if sufficient force is applied the door can be opened. If this method is used to force the closure open, the lock position is not relevant.

The bolt 18 also has tapered portions 19 and 21 which reduce the resistance of the T-handle assembly 10 to attempts to force open the door of the closure.

Figure 2:
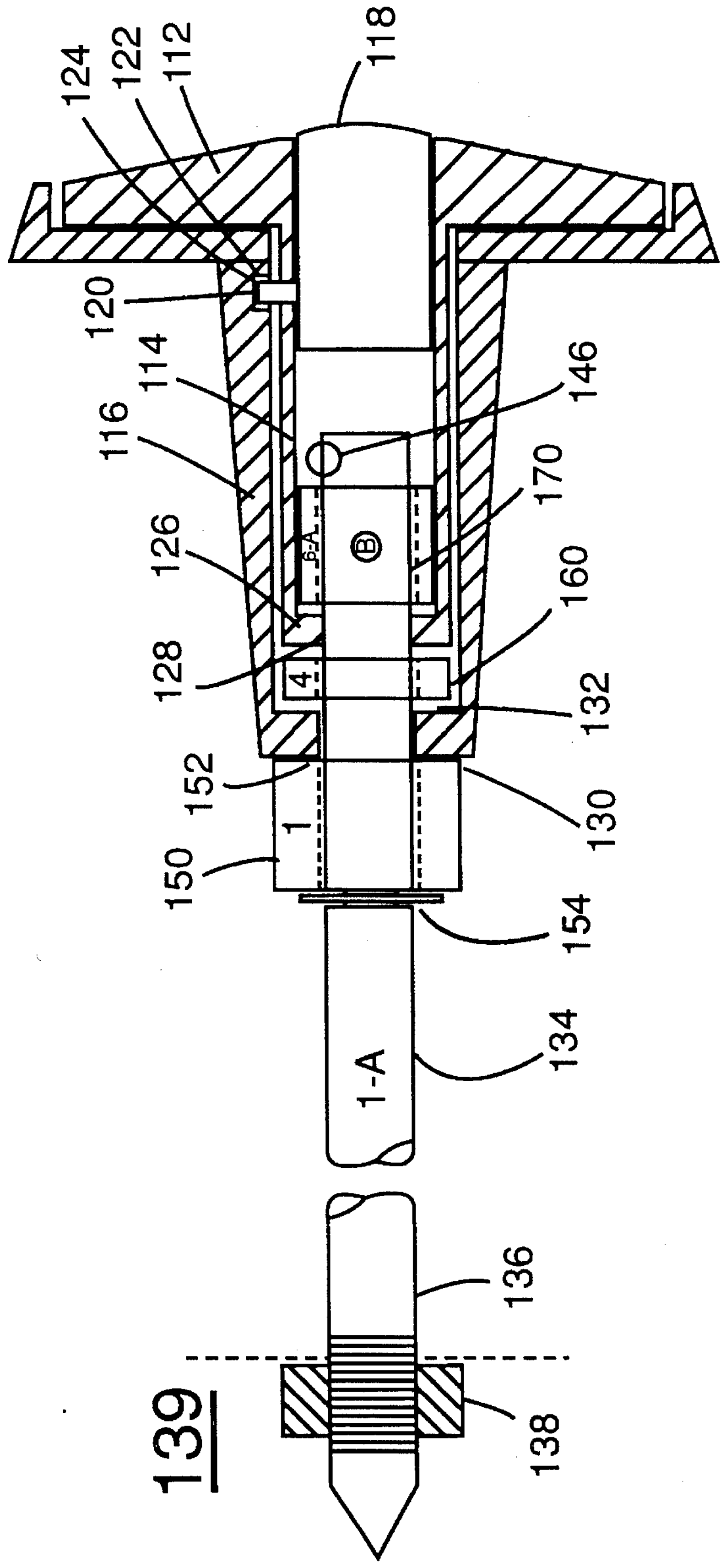
FIG. 2 shows a sectional view of a T-handle assembly employing the bolt mechanism of the present invention.

Referring now to FIG. 2 a sectional view of a first embodiment of a T-handle assembly using the bolt mechanism of the present invention is shown. The assembly includes a T-handle 112 having an elongated hollow portion 114 which is adapted to fit within a housing 116 which is secured to the closure door (not shown) by a suitable fastening means such as screws (not shown). A lock 118 having a locking bolt 120 is used to secure the T-handle 112 in the housing 116 so that movement of the T-handle relative to the housing is prevented. The locking bolt 120 projects through an aperture 122 in the T-handle 112 and a corresponding aperture 124 in the housing 116 when the lock 118 is in the locked position. The locking bolt 120 is tapered so that it can be completely disengaged from apertures 122 and 124 as will be explained later. A standard locking bolt could not be used with the present invention since the lock 118 could not be removed from the T-handle 112. The rear face 126 of the T-handle 112 has an aperture 128 formed therein which is axially aligned with the aperture 130 in the rear face 132 of the housing 114.

The bolt 134 has a threaded end 136 which is threaded into a nut 138 which is secured to the interior 139 of the closure, the bolt preventing opening of the door when threaded into the nut. It should be noted that the embodiment of the invention shown in FIG. 2 is to be used with a vending machine having a split nut design which effects quicker closing of the vending machine door.

Figures 3, 4, 5, 6, 7, 8, 9, 10, 11, 12:
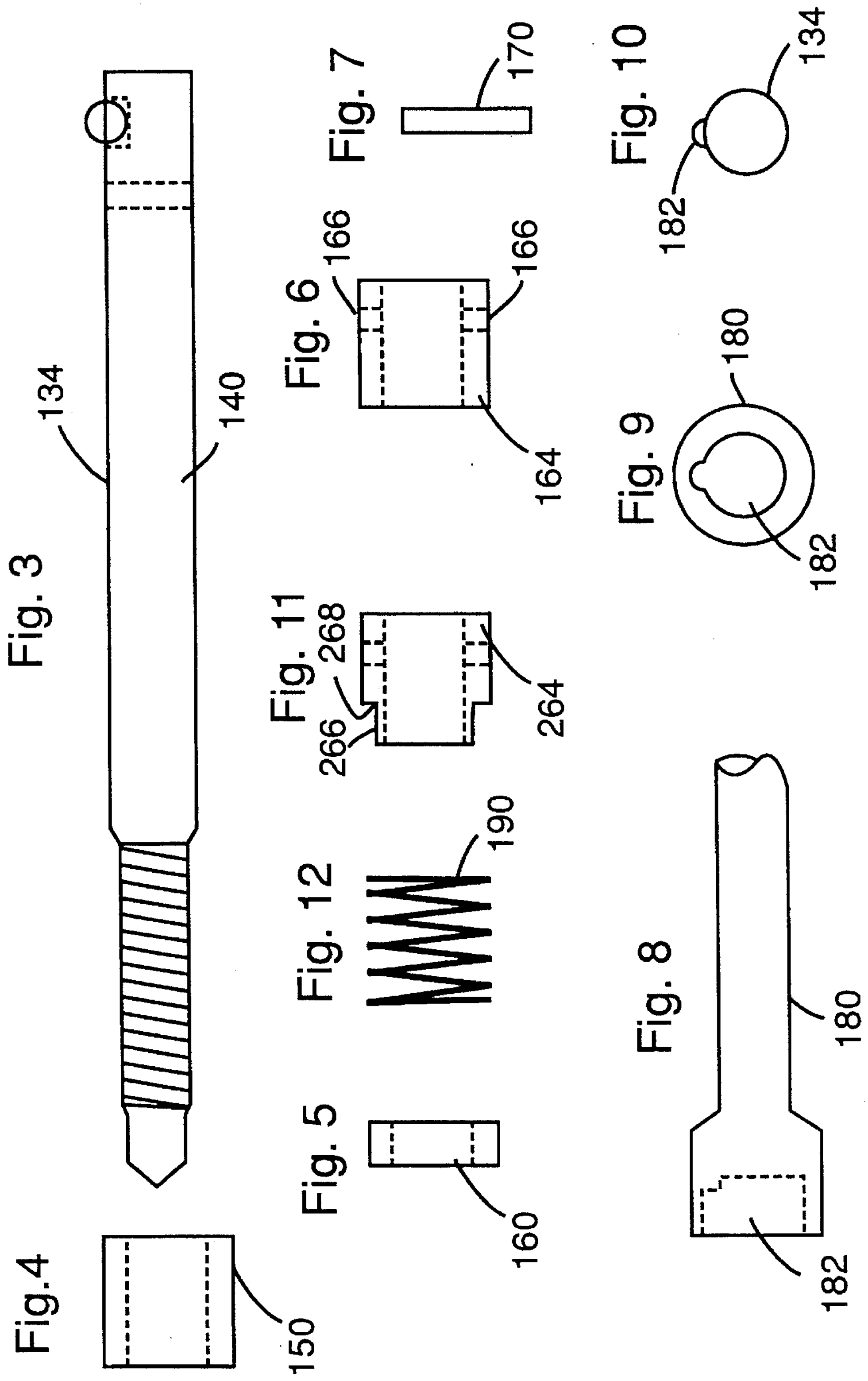
FIG. 3 shows a side view with portions cut away of the bolt of the present invention.
FIG. 4 is a side view of a bushing to be used with a first embodiment of the bolt mechanism.
FIG. 5 is a side view of a spacer which fits between the T-handle and the T-handle housing.
FIG. 6 is a side view of a security collar which fits over the bolt.
FIG. 7 is a side view of a pin which is used to hold the security collar stationary relative to the bolt.
FIG. 8 shows a side view of a wrench used to rotate the bolt.
FIG. 9 shows an end view of the wrench of FIG. 8.
FIG. 10 shows an end view of the bolt.
FIG. 11 shows a side view of an alternative embodiment of the security collar of FIG. 6.
FIG. 12 shows a side view of a spring to be used with the security collar of FIG. 11.

FIG. 3 shows a side view of the bolt 134. The bolt 134 has a cylindrical main body 140 having an end portion with an aperture 142 and a recess 144 formed therein. The recess 144 is adapted to hold a ball bearing 146 therein. The aperture 142 is used to retain a holding pin as will be explained later. The non-threaded end of bolt 134 of the present invention has a constant outer diameter with the exception of annular groove 156 within which retainer ring 154 is seated as shown in FIG. 2, and does not include a tapered portion.

A bushing 150 shown in FIG. 4 is used in place of the spring which is typically used with vending machines of the split nut type. The bushing 150, which is compressible, has an axial displacement which allows the bolt 134 to screw all the way into the nut 138. This enables the door to remain flush against the door frame, thereby avoiding the possibilty of extra space created as a result of incomplete penetration of the bolt into the nut 138. It will be appreciated by those familiar with the art that the spring which is typically provided with prior art T-handle assemblies of the split nut type can tend to prevent full penetration of the threaded end 136 of the bolt into the nut. This typically occurs when the spring becomes deformed due to repeated opening and closing of the door. When the spring is thus deformed, it will tend to limit axial movement of the bolt 134 in the direction of the nut 138. This in turn will affect how tightly the door is closed. The bushing 150 is mounted flush against the exterior surface 152 of the rear face 132 of the housing 116. The other side of the bushing 150 abuts an annular retaining ring 154 which is seated in an annular groove 156 formed in the bolt 134. If the T-handle is being manufactured to include the improved bolt mechanism of the present invention the bushing 150 can be omitted by recasting the housing 116 to have an axially extending cylindrical portion which extends from rear face 132 to retaining ring 154. Thus an integral "bushing" would be formed.

A spacer 160 shown in FIG. 5 is used to limit axial movement of all of the components of the T-handle assembly by taking up any slack between the various components. Thus, if any force is applied on the bolt mechanism in an attempt to force the door, the force is distributed evenly along the entire mechanism thereby preventing excessive stress on any one component.

The security collar 164 shown in FIG. 6 is used as a secondary means to secure the T-handle 112 within the housing 116. The security collar 164 has an axial bore for receiving bolt 134 and a pair of aligned apertures 166 and 166' which are adapted to receive the ends of pin 170 which is shown in FIG. 7. The security collar 164 is held in place on the bolt 134 by pin 170 which extends through aperture 142 on the bolt (FIG. 3), the ends of pin 170 projecting into aligned apertures 166 and 166'.

Thus the bolt mechansim is held in place in the housing 116 by security collar 164 which abuts both rear face 126 of the T-handle 112 and ball bearing 146, even when the lock 118 is removed. Furthermore, since security collar 164 is mounted flush against the rear face 126 of T-handle 112 the T-handle cannot be moved until the bolt 134 is disengaged from the nut 138. If it is desired to completely remove the T-handle 112 after the bolt has been disengaged from the nut 138 a special tool (not shown) which provides frictional engagement with the interior surface of the T-handle can be provided. Of course, any suitable means can be employed to remove the T-handle 112.

The wrench 180 shown in FIG. 8 is used to rotate the bolt 134. The wrench 180 has a recess 182 formed therein which is shaped to conform to the cross section of the end portion of the bolt 134 as is shown in FIGS. 9 and 10. Numerous arrangements of ball bearings 146 can be used to vary the cross sectional dimensions of the end portion of the bolt thereby requiring that the shape of recess 182 be varied in order to effect engagement with the end portion of the bolt 134. Multiple ball bearings 146 placed at various radial positions about the end portion of bolt 134 can be used so that each of the bolt mechanisms requires a unique wrench. In addition to the arrangement of ball bearings 146, pins 170 can be used to vary the cross sectional dimensions of the end portion of the bolt 134. If desired, a combination of ball bearings and pins can be used.

In operation, if the T-handle assembly is locked as shown in FIG. 2, a key is inserted into the lock 118 and turned until the lock bolt 120 disengages from the apertures 122 and 124. The lock 118 is then entirely removed from the elongated hollow portion of the T-handle. At this point, the components of the T-handle assembly remain stationary relative to the housing 116 since there is no spring to urge the T-handle 112 out of the housing. The wrench 180 is inserted and placed about the end portion of the bolt 134 whereby the bolt can be rotated until the threaded end of the bolt 134 is disengaged from the nut 138. The closure door can then be opened. When locking the closure, the reverse procedure is applied. The lock bolt 120 is preferably tapered so that the lock can be completely removed from the T-handle.

If one were to attempt to forcibly open the closure door with the bolt 134 secured in the nut 138 the security collar 164 would have to be moved axially along the bolt 134 to effect movement of the T-handle 112 and the T-handle housing 116 relative to the stationary bolt. In order for this to occur, the pin 170 would have to be sheared and the security collar 164 would have to be pulled over ball bearing 146. This would be exceptionally difficult since the security collar 164, the pin 170, and the ball bearing 146 are all preferably made of steel.

Referring now to FIGS. 11 and 12 components for an alternative bolt mechanism including security collar 264 and an associated spring 190 are shown. This alternative bolt mechanism is used with vending machines or closures with an ordinary threaded bolt 134. The bushing 150 of the previous embodiment is not used in this embodiment as the spacing between the closure door and the door frame is maintained by rotation of the bolt 134.

FIG. 11 shows the security collar 264 having a projecting end portion 266 having a smaller outer diameter than the main body of the collar. The collar 264 has aligned apertures 265 and 265' which are adapted to receive pin 170. A spring 190 (FIG. 12) is adapted to fit onto the projecting end portion 266, one end of the spring abutting the annular seat 268 formed in the collar 264.

The security collar 264 is mounted on the bolt and held in place by pin 170. Spring 190 is placed between annular seat 268 and rear face 126. As the security collar is held stationary by the pin 170, the spring 190 serves to exert force on the rear face 126 of the T-handle thereby maintaining the T-handle stationary even after the lock 118 is disengaged. The operation of this embodiment is exactly the same as in the previous embodiment.

It will be appreciated that the present invention provides essentially a dual lock T-handle assembly, the first lock 118 requiring a key and the second "lock" requiring a special wrench 180. Thus if one is servicing the machine and needs to leave for only a few minutes, he can lock the closure door with the wrench 180 to save time and effort when reopening the door. Likewise if a vandal manages to defeat the lock 118, he still has to contend with the bolt mechanism.

What is claimed is:

1. A high security bolt mechanism for a T-handle assembly of the type containing a lock movable between a locked and an unlocked condition, the mechanism operable to prevent opening of an associated closure door when the lock is in the locked or unlocked condition, the mechanism comprising:

a bolt having at least one aperture and at least one recess formed therein, said bolt having a threaded end and a non-threaded end;

a security collar encircling said bolt proximate said non-threaded end and having at least one mutually opposed pair of apertures corresponding to said at least one bolt aperture, said collar apertures and said bolt aperture adapted to receive a holding pin which holds the collar stationary relative to the bolt;

said at least one recess located between said security collar and said non-threaded end of said bolt;

a ball bearing adapted to fit within said at least one recess, said ball bearing preventing axial movement of said security collar in the direction of said non-threaded end.

2. The mechanism of claim 1 where said bolt mechanism can be used with standard T-handle assemblies.

3. The mechanism of claim 1 where said bolt mechanism is rotated by a specially adapted wrench to effect removal of the bolt mechanism.

4. The mechanism of claim 1 where the bolt has a cylindrical main body with a threaded end portion, the main body having an essentially constant outer diameter.

5. The mechanism of claim 1 where said bolt mechanism includes a bushing adapted to ensure a tight closure between said door and an associated door frame.

6. The mechanism of claim 1 where said bolt mechanism includes a spacer adapted to cause even force distribution along the length of the bolt mechanism.

* * * * *